United States Patent
Selwyn

(10) Patent No.: US 9,790,640 B2
(45) Date of Patent: Oct. 17, 2017

(54) COMPOSITION AND PROCESS FOR APPLYING HYDROPHOBIC COATING TO FIBROUS SUBSTRATES

(71) Applicant: Gary S Selwyn, Albuquerque, NM (US)

(72) Inventor: Gary S Selwyn, Albuquerque, NM (US)

( * ) Notice: Subject to any disclaimer, the term of this patent is extended or adjusted under 35 U.S.C. 154(b) by 0 days.

(21) Appl. No.: 14/188,608

(22) Filed: Feb. 24, 2014

(65) Prior Publication Data

US 2015/0240413 A1    Aug. 27, 2015

(51) Int. Cl.

| | |
|---|---|
| *D06M 15/263* | (2006.01) |
| *C09D 4/00* | (2006.01) |
| *C09D 4/06* | (2006.01) |
| *D06M 10/10* | (2006.01) |
| *D06M 15/705* | (2006.01) |
| *C09D 183/04* | (2006.01) |

(52) U.S. Cl.
CPC ............. *D06M 15/263* (2013.01); *C09D 4/00* (2013.01); *C09D 4/06* (2013.01); *D06M 10/10* (2013.01); *D06M 15/705* (2013.01); *C09D 183/04* (2013.01); *D06M 2200/12* (2013.01)

(58) Field of Classification Search
CPC .. D06M 15/263; D06M 15/705; D06M 10/10; D06M 2200/12; C09D 4/00; C09D 4/06; C09D 183/04
See application file for complete search history.

(56) References Cited

U.S. PATENT DOCUMENTS

| | | | | |
|---|---|---|---|---|
| 3,989,609 A | * | 11/1976 | Brack | .......... C08F 299/06 428/41.5 |
| 4,070,526 A | * | 1/1978 | Colquhoun | ......... C08F 283/122 427/515 |
| 4,193,762 A | | 3/1980 | Namboodri | |
| 4,559,150 A | | 12/1985 | Becker | |
| 4,561,950 A | * | 12/1985 | Leo | ...... C08F 299/065 522/91 |
| 4,868,262 A | | 9/1989 | Esselborn | |
| 5,308,887 A | * | 5/1994 | Ko | ............. C09J 4/00 428/446 |
| 5,888,649 A | * | 3/1999 | Curatolo | ......... C09D 4/00 428/352 |
| 7,056,845 B2 | | 6/2006 | Waeber | |
| 7,790,238 B2 | | 9/2010 | Keller | |
| 7,955,518 B2 | | 6/2011 | Keller | |
| 2009/0028916 A1 | | 1/2009 | Petit | |
| 2009/0137171 A1 | | 5/2009 | Waeber | |
| 2009/0192239 A1 | * | 7/2009 | Hecht | ........ A61K 6/0017 522/166 |
| 2009/0318044 A1 | | 12/2009 | Butz | |
| 2010/0255210 A1 | | 10/2010 | Falkowski | |
| 2011/0201728 A1 | | 8/2011 | Yamamoto | |

FOREIGN PATENT DOCUMENTS

| | | | | | |
|---|---|---|---|---|---|
| KR | 2008068297 A | * | 7/2008 | .......... | C09D 133/10 |
| WO | WO 0217421 A2 | * | 2/2002 | .......... | C09D 175/16 |

* cited by examiner

*Primary Examiner* — Satya Sastri
(74) *Attorney, Agent, or Firm* — Gary C. Cohn PLLC

(57) ABSTRACT

Fabrics are treated with a hydrophobic treatment that includes at least one hydrophobic monomer and a crosslinker. The treatment is low in volatile organic compounds and water. It is a liquid at 22° C. or a suspension having a phase that is liquid at 22° C. The monomer and crosslinker are cured in a free radical polymerization to form a hydrophobic coating on a fibrous substrate.

12 Claims, No Drawings

COMPOSITION AND PROCESS FOR APPLYING HYDROPHOBIC COATING TO FIBROUS SUBSTRATES

The present invention relates generally to a composition and process for applying a hydrophobic coating to a fibrous substrate such as a textile or a nonwoven.

Hydrophobic coatings are applied to fibrous substrates such textiles and nonwovens to provide a water-repellant finish for apparel such as rain gear and for a wide variety of industrial, vehicular and construction applications in which it is important to prevent water from wetting or seeping through the substrate.

The most common way of applying such coatings is by a "pad and cure" method that involves pulling a length of woven or knitted fabric through an aqueous chemical bath, squeezing or vacuuming out the excess liquid and then drying or curing the wet fabric in a long, air-operated oven called a "tenter frame." A finishing solution containing multiple ingredients is used in the chemical bath. This process entails a great many difficulties, including textile shrinkage, inconsistent application of the active ingredients, time-varying changes in the concentration of bath ingredients, the use of large amounts of energy to remove the water, and large amounts of chemical waste water which needs to be recycled or disposed of. In addition, many materials cannot be coated onto a textile in this manner, because they are not compatible with water or else react prematurely with themselves or other ingredients in the bath, or because they will quickly precipitate out of the bath.

Examples of water-based textile treatment processes include those described, for example, in U.S. Pat. Nos. 4,868,262, 7,056,845, 7,790,238 and 7,955,518 and US Patent Application Publication US2009/0137171. U.S. Pat. No. 4,193,762 describes the use of an aqueous foam that is applied to a textile surface and which uses pressure rollers to break the foam and impregnate the finishing agent into the textile as a step prior to heat-based drying and curing. This treatment process may be done on one or both sides of the textile. As this approach relies upon the use of water-based chemistry, it too is limited by possible chemical reactions between the finishing components and water. US Patent Publication 2011/0201728 discloses a method for free radical polymerization of various monomers and co-polymers that are dispersed in water, but does not teach the use of crosslinkers combined with monomeric ingredients, or the use of a free radical initiator or application of the monomeric mixture on textiles.

US Patent Publication 2008/0090004 described treating a fabric by dipping it into coating composition, or by spraying a coating composition that contains an organic, liquid solvent. After application of this liquid solvent to the fabric, heat-curing is used to finish the treatment and to evaporate the liquid, organic solvent. Similarly, U.S. Pat. No. 4,559,150 describes the use of liquid organic solvents that enable the dissolution of a whitening agent for finishing various textile applications, such as curtains or underwear. The use of organic solvents is undesirable due to worker exposure and environmental issues, as well as added costs for recovery and reuse of the solvents.

US Patent Publication 2008/0107822 describes a method of coating a textile or nonwoven with a nano-scale thickness of vapor-condensed monomers plus additional chemicals, followed by a plasma-based curing method to polymerize the coated monomer. The low molecular weight monomers used in this process cannot be cured in an oven due to their volatility.

This invention is in a first aspect a curable coating composition comprising a) at least one free-radical-curable monomer having exactly one polymerizable group per molecule, the free-radical-curable monomer having at least one hydrocarbyl group that has at least eight carbon atoms bonded directly or indirectly to the polymerizable group, the free-radical-curable monomer having a boiling point that is equal to or greater than 100° C., and b) at least one crosslinking monomer having at least two free-radical-curable polymerizable groups and a boiling temperature that is equal to or greater than 100° C.;

wherein the coating composition is a liquid at 22° C. or a suspension of one or more solids in a liquid phase at 22° C.

The coating composition preferably contains no more than 10% by weight of organic compounds that have boiling temperatures below 100° C. and no more than 5% by weight water, based on the entire weight of the coating composition.

The invention in a second aspect is a method for coating a substrate, comprising 1) applying liquid water and a curable coating composition to at least one surface of a fibrous substrate to form a moistened and coated fibrous substrate;

2) heating the moistened and coated fibrous substrate to volatilize the water and produce steam at superatmospheric pressure in contact with the fibrous substrate;

3) simultaneously with and/or after step b), curing the curable coating composition by free-radical polymerization to form a coated substrate, wherein the curable coating composition at the time of application to the fibrous substrate contains no more than 10% by weight of organic compounds that have boiling temperatures below 100° C. and no more than 5% by weight water, based on the entire weight of the coating composition, and further contains a) at least one free-radical-curable monomer having exactly one polymerizable group per molecule, the free-radical-curable monomer having at least one hydrocarbyl group that has at least eight carbon atoms bonded directly or indirectly to the polymerizable group, the free-radical-curable monomer having a boiling temperature that is greater or equal to 100° C. and b) at least one crosslinking monomer having at least two free-radical-curable polymerizable groups and a boiling temperature at of at least 100° C.

The invention is in a third aspect another method for coating a substrate, comprising 1) applying a curable coating composition to at least one surface of a fibrous substrate to form a coated fibrous substrate;

2) heating the coated fibrous substrate in the presence of a gas or a blowing agent to produce a superatmospheric pressure gas in contact with the substrate;

3) simultaneously with and/or after step b), curing the curing coating composition by free-radical polymerization to form a coated substrate, wherein the curable coating composition at the time of application to the fibrous substrate contains no more than 10% by weight of organic compounds that have boiling temperatures below 100° C. and no more than 5% by weight water, based on the entire weight of the coating composition, and further contains a) at least one free-radical-curable monomer having exactly one polymerizable group per molecule, the free-radical-curable monomer having at least one hydrocarbyl group that has at least eight carbon atoms bonded directly or indirectly to the polymerizable group, the free-radical-curable monomer having a boiling temperature of at least 100° C. and b) at least one crosslinking monomer having at least two free-radical-curable polymerizable groups and a boiling temperature of at least 100° C.

Component a) is one or more free-radical-curable monomers that have exactly one free-radical-polymerizable group per molecule. The free-radical-curable monomer has at least one hydrocarbyl group that has at least eight carbon atoms bonded directly or indirectly to the polymerizable group. The hydrocarbyl groups may be partially fluorinated or perfluorinated. The free-radical-curable monomer component a) has a boiling temperature of at least 100° C. The boiling temperature preferably is at least 120° C. and more preferably at least 150° C. All boiling temperatures mentioned herein are at one atmosphere pressure.

The component a) monomer or monomers may be liquid or solid at 22° C. If a mixture of component a) monomers is used, they may all be liquids, may all be solids, or they may include a mixture of solid and liquid monomers. In preferred embodiments, component a) is a mixture of at least two monomers, at least one of which is solid at 22° C. and at least one of which is liquid at 22° C.

The free-radical polymerizable group can be any that polymerizes in a free-radical polymerization, but preferably is an acrylate, methacrylate or chlorosilane group. Acrylate and/or methacrylate groups are most preferred.

The hydrocarbyl group may be linear or branched aliphatic, alicyclic, aromatic or a group which contains of two or more thereof. The hydrocarbyl group may contain at least 10 or at least 12 carbon atoms. The hydrocarbyl groups may contain, for example, 8 to 24 carbon atoms, or 10 to 20 carbon atoms, or 12 to 18 carbon atoms. In some embodiments, the hydrocarbyl group is a linear alkyl or alkenyl group having 8 to 24, 10 to 20 or 12 to 18 carbon atoms. In some embodiments, the hydrocarbyl group is partially or perfluorinated, and contains 8 to 24, preferably 10 to 20 carbon atoms.

The hydrocarbyl group may be bonded directly (i.e., through a covalent bond) to the free-radical polymerizable group, or indirectly thereto through a linking group.

The component a) monomer(s) preferably have a solubility in water of no greater than 2 parts by weight, more preferably no greater than 1 parts by weight, and still more preferably no more than 0.25 part by weight, per 100 parts by weight of water, at 30° C. Water preferably is soluble in the component a) monomer(s) to the extent of no greater than 2 parts by weight, more preferably no greater than 1 parts by weight and more preferably no greater than 0.25 part by weight, per 100 parts by weight of the monomer(s), at 30° C.

Examples of component a) monomers include, but are not limited to, one or more of the following: octyl acrylate, octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl)ethyl acrylate, 2-(perfluorohexyl)ethyl methacrylate, 2-(perfluorooctyl) ethyl methacrylate, lauryl methacrylate, stearyl methacrylate, 2-(perfluorodecyl)ethyl methacrylate, 2-(perfluorooctyl)ethyl trichlorosilane and vinyl naphthalene. Among these, the acrylate and methacrylate monomers described above are most preferred.

Component b) is at least one crosslinking monomer having at least two free-radical-curable groups and a boiling temperature of at least 100° C. The boiling temperature preferably is at least 125° C. and more preferably at least 150° C. The crosslinking monomer preferably is a liquid at 22° C. The free-radical-curable polymerizable groups may be as described above with regard to component a), with acrylate or methacrylate groups being preferred. The crosslinking monomers may have, for example 2 to 20, preferably 2 to 8 and more preferably 2 to 6 free-radical-curable groups per molecule. Examples of crosslinking monomers include polyacrylate or polymethacrylate compounds having 2 to 20, preferably 2 to 8 or 2 to 6 acrylate and/or methacrylate groups per molecule. Specific examples include acrylate and/or methacrylate esters of polyols having 2 to 50, 2 to 20 or 4 to 12 carbon atoms, such as 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, diepentaerythritol hexacrylate, the corresponding methacrylates, and the like. So-called drying oils like linseed oil, safflower oil and tung oil are also useful crosslinkers.

The coating composition may and typically will have one or more optional ingredients in addition to the monomer(s) described above. The selection of ingredients, their proportions and the manner of preparing the composition are all made such that the coating composition is a liquid at 22° C. or a suspension of one or more solids in a liquid phase at 22° C., and the coating composition contains no more than 10% by weight of organic compounds that have boiling temperatures below 100° C. and no more than 5% by weight water, based on the entire weight of the coating composition. The curable coating composition preferably contains no more than 5%, more preferably no more than 2%, still more preferably no more than 1%, and even more preferably no more than 0.25% by weight of organic compounds that have boiling temperatures below 100° C., and no more than 2%, more preferably no more than 1% and still more preferably no more than 0.25% by weight of water.

Among the optional ingredients that may be present in the coating composition are:

c) One or more free-radical-curable monomers different from components a) and b). Such a monomer may have a boiling temperature of below 100° C., and/or may lack a hydrocarbyl group of eight or more carbon atoms. Such a monomer may have exactly one free-radical-polymerizable group, or may have more than one such group, in which case it will function as a cross-linker. Such a monomer may be a liquid or solid at 22° C. The component c) monomer, if present, preferably is copolymerizable with the component a) and b) monomers. Preferred free-radical-polymerizable groups on the component c) monomer(s) are acrylate and methacrylate. Examples of component c) monomers include hexyl acrylate, butyl acrylate, hydroxyethyl acrylate, methyl acrylate, ethyl acrylate, hexyl methacrylate, butyl methacrylate, hydroxyethyl methacrylate, methyl methacrylate, ethyl methacrylate, 2-(perfluorobutyl)ethyl acrylate, 2-(perfluorobutyl)ethyl methacrylate, styrene, ethylene benzene, chlorostyrene, and the like.

d) One or more heat-activated free-radical initiators. Suitable free radical initiators include, for example, 1) acyl peroxides, such as acetyl or benzoyl peroxides, 2) alkyl peroxides, such as cumyl, dicumyl, lauroyl, or t-butyl peroxides, 3) hydroperoxides, such as t-butyl or cumyl hydroperoxides, 4) peresters, such t-butyl perbenzoate, 5) other organic peroxides, including acyl alkylsulfonyl peroxides, dialkyl peroxydicarbonates, diperoxyketals, or ketone peroxides, 6) azo compounds, such as 2,2'-azobisisobutyronitrile (AIBN) or 2,2'-azobis(2,4-dimethylpentanenitrile), 4,4'-azobis(4-cyanovaleric acid), or 1,1'-azobis (cyclohexanecarbonitrile), 7) various tetrazines and 8) various persulfate compounds, such as potassium persulfate.

Free radical initiators that are solids at 22° C. are preferred, as are those having a 10 hour half-life at a temperature of 60° C. or more.

e) One or more carriers. Useful carriers or mixture of carriers are liquid at 22° C. or else are materials that are solid at 22° C. but-have a melting temperature of 100° C. or less, preferably 50° C. or less. The carrier preferably also has a boiling temperature of at least 100° C., more preferably at least 125° C. and still more preferably at least 150° C. The carrier contains no free-radical-polymerizable groups. Preferred carriers have water-solubility characteristics as described with respect to the component a) monomers. However, the carrier preferably is soluble in or becomes partially entrained into the polymer formed when the coating composition is cured.

Examples of useful carriers are aliphatic monoalcohols or aliphatic monocarboxylic acids having 14 to 30 carbon atoms; esters of a fatty acid and a fatty alcohol, the ester having 18 to 48 carbon atoms, preferably 20 to 36 carbon atoms; a polyether having one or more hydroxyl groups; a polysiloxane, which can be linear, branched or cyclic; (v) a polysiloxane-poly(alkylene glycol) copolymer; (vi) a wax, such as a polyethylene wax, bees wax, lanolin, carnauba wax, candelilla wax, ouricury wax, sugarcane wax, jojoba wax, epicuticular wax, coconut wax, petroleum wax, paraffin wax and the like; (vii) a fluoropolymer, (viii) solid vegetable and/or animal oils or fats; (viii) another organic oligomer or polymer having a pure phase melting or softening temperature up to 100° C. or (ix) various plasticizers.

Among the aliphatic monoalcohols are fatty alcohols, including saturated fatty alcohols such as 1-dodecanol, 1-tetradecanol, 1-hexadecanol, 1-octadecanol, and the like, as well as fatty alcohols have one or more sites of carbon-carbon unsaturation in the fatty alcohol chain. Among the useful esters of a fatty acid and a fatty alcohol are, for example, hexyl octadecanoate, octyl octadecanoate, dodecyl octadecanoate, hexadodecanoate octadecanoate, and the like. The fatty acid and/or fatty alcohol portions of the ester may contain one or more sites of carbon-carbon unsaturation.

Suitable polyethers are polymers of one or more cyclic ethers such as propylene oxide, tetramethylene glycol and the like. The molecular weight is high enough to produce a polymer having a melting temperature up to 100° C. The polyether may contain one or more hydroxyl groups. It may be linear or branched. The polyether may contain terminal alkyl ester groups. Specific examples of suitable polyethers include poly(ethylene oxide), monoalkyl esters of a poly(ethylene oxide), poly(propylene oxide), monoalkyl esters of a poly(propylene oxide), ethylene oxide-propylene oxide copolymers and monoalkyl esters thereof, poly(tetramethylene oxide) and the like.

Useful polysiloxanes include, for example, poly(dimethyl siloxane) and copolymers thereof. The polysiloxane may be linear, branched or cyclic. Useful siloxane-poly(alkylene glycol) copolymers include, for example, poly(dimethyl siloxane-poly(ethylene glycol) copolymers which can have a block or graft structure.

Organic polymers having melting temperatures below 100° C. that are useful as a component of the carrier or mixture of carriers includes low molecular weight polyamides, low molecular weight polyethers, low molecular weight polystyrene, low molecular weight acrylate polymers and copolymers such as poly (ethylene glycol) methyl ether methacrylate (PEGMEA), polyacrylamide, poly(N-isopropylacrylamide), poly(acrylic acid), low molecular weight thermoplastic cellulose ethers and esters, poly(2-ethyl-acrylic acid), poly(vinylphosphonic acid), poly(sodium 4-styrenesulfonate), poly(2-ethyl-2-oxazoline) and the like.

Among the plasticizers are phthalate esters, trimellitate esters, adipate esters, maleate esters, benzoate esters, terephthalate esters, various fatty acid esters, epoxidized vegetable oils, sulfonamides, organophosphates, alkyl citrates, acetylated monogylcerides and the like.

The carrier may provide certain functional attributes to the cured composition. In some embodiments, the carrier provides increased hydrophobicity and/or oleophobic properties to the cured composition. It may also perform a plasticizing function.

Especially preferred carriers include polysiloxane oils, waxes and alcohol carriers. Especially preferred polysiloxane oils include octamethylcyclotetrasiloxane, decamethylcyclopentasiloxane, and linear or branchedpolydimethylsiloxane (PDMS) oil, polymethylhydrosiloxane (PMHS) oil, and other liquid cyclomethicones. Paraffin or beeswax waxes are especially preferred wax carriers. Stearyl and cetyl alcohol are especially preferred alcohol carriers and are solids at 22° C.

The carrier may also include low molecular weight organic compounds that have boiling temperatures below 100° C., but if such materials are present, they preferably constitute in the aggregate no more than 2 weight percent of the curable composition, and preferably no more than 1 weight percent or 0.25 weight percent thereof. These low molecular weight organic compounds include, for example, liquid polyethers and polyether mono alkyl esters such as PPG-14 monobutyl ester; liquid alkanes such as n-hexane, n-pentane, n-heptane, henicosane, docosane, tricosane, tetracosane, pentacosane, hexacosane, heptacosane, octacosane, nonacosane, triacontane and the like; liquid alcohols such as n-propanol, isopropanol, n-butanol, t-butanol, methanol and ethanol; fluorinated alkanes such as perfluorohexane, perfluoroheptane, perflurodecane-pinane, perfluorodecane-octane, perfluorododecane and the like; chlorinated alkanes and chlorinated aromatic compounds such as isoamyl chloride, isobutyl chloride and benzyl chloride; alkane diols and polyalkylene glycols such as ethylene glycol, propylene glycol, diethylene glycol, triethylene glycol, dipropylene glycol, tripropylene glycol and 1,4-butane diol; liquid esters such as diisopropyl sebacate and glycerol tripalmitate; ketones such as acetone and methyl ethyl ketone; liquid fatty acids such as stearic acid, oleic acid, palmitic acid, lauric acid and the like; 1-naphthalamine; biphenyl; benzophenone; diphenyl amine; 1,2-diphenylethane; maleic anhydride; pyrazine; thymol; glycerin; sorbitol or other sugars; and dibenzylidene sorbitol.

f) One or more finishing attribute chemicals. A "finishing attribute chemical" is a compound, other than the carrier and monomer(s), which remains with the substrate after the treatment process of the invention and imparts some desirable characteristic to the substrate. Examples of finishing attribute chemicals include, for example:

f-1) hydrophobic treatments, i.e., chemicals that impart water-repellency and/or hydrophobic characteristics to the treated substrate;

f-2) oleophobic treatments, i.e., substances that render the treated substrate not readily absorbent to fats and oils, or repellent to fats and oils;

f-3) super-hydrophobicity agents; i.e., substances that impart very high (>130°) contact angles of a water droplet with a surface of the treated substrate. The super-hydrophobicity agent may include solid particles sized from 50 nm to 100 microns such as powdered fluorocarbon polymer powders. Other super-hydrophobicity agents include chlorinated or fluorinated silicone compounds such as heptadecafluorodecyltrimethoxysilane, octadecyldimethylchlorosilane, tris(trimethylsiloxy)silylethyldimethylchlorosilane, octyldimethylchlorosilane, dimethyldichlorosilane, butyldimethylchlorosilane and trimethylchlorosilane.

f-4) Particulate solids that perform functions such as fillers, water scavengers, coloring agents, flame retardants, abrasives, rheology modifiers, and the like. Such particulate solids include, for example, silica gel particles, fumed silica, hydrophobic fumed silica, glass or other ceramic particles, polystyrene particles, polytetrafluoroethylene particles, poly(vinyl fluoride) particles, poly(vinylidene fluoride) particles, poly(hexafluoropropylene particles, poly(perfluoropropylvinylether) particles, poly-(perfluoromethylvinylether) particles, poly(chlorotrifluoroethylene) particles, polypropylene microspheres, mineral powders such as talc, iron carbonate and calcium carbonate, chitosan particles and flame retardant minerals, such as calcium carbonate, aluminum hydroxide, magnesium hydroxide, various borates and inorganic hydrates, titanium carbide, tungsten carbide, pumice, silicon carbide, zirconia alumina.

f-5) antimicrobial treatments, i.e., substances that inhibit microbial growth and/or kill microorganisms.

f-6) UV absorbers and/or UV reflectors such as avobenzone, rutile titanium dioxide, silicon dioxide, homosalate, oxybenzone, 4-aminobenzoic acid (PABA), octisalate, octocylene, 2-ethylhexyl 4-dimethylaminobenzoate and the like;

f-7) Colorants such as dyes and pigments. These include acid dyes, reactive dyes, and disperse dyes.

f-8) Wrinkle-resisting agents, such as melamine-formaldehyde resins and urea-formaldehyde resins;

f-9) fabric softeners and anti-chafing agents, such as polydimethylsiloxane and polymethylhydrosilane;

f-10) Light and/or heat-reflecting materials such as reflective metal particles, titanium dioxide or ZnO particles and the like.

f-11) Emollients which create, for example, softness, wear comfort and/or moisturizing properties.

f-12) Insecticides and/or insect repellants, such as metofluthrin, transfluthrin, dichlovos, thyme oil, rosemary oil, citronella oil, cinnamon bark oil, lemon eucalyptus oil, lemongrass oil, and cedar wood oil.

f-13) Liquid flame retardants, including various organophosphorous, bromine and boron-containing compounds.

f-14) Trace forensic chemical markers that are added to the formulation to help detect counterfeit goods or counterfeit finishing treatment. Such markers may contain rare earth elements, such as yittrium, scandium, cerium, europium or erbium, or other elements not normally found in textiles, or compounds that provide detectable fluorescence when exposed to ultraviolet light.

The chemical treatment mixture may also include g) one or more promoters or activators for a polymerization catalyst and/or free radical initiator. Metal salts such as iron or vanadium salts and manganese ions or manganese are examples of such promoters.

The chemical treatment mixture may further contain h) one or more blowing agents. Suitable blowing agents include physical (endothermic) types which are liquids at 22° C. but volatilize under the conditions of the curing step, and physical types which decompose or otherwise react under the conditions of the curing reaction to form a gas. If an organic physical blowing agent is present, it should be used in small amounts such that the curable composition contains no more than 10%, preferably no more than 5%, more preferably no more than 2% and still more preferably no more than 1%, even more preferably no more than 0.25% by weight of organic compounds having a boiling temperature of less than 100° C. Chemical blowing agents preferably generate carbon dioxide or nitrogen; these include the so-called azo types, peroxy blowing agents such as peroxyesters, peroxycarbonates and the like, and certain carbamate and citrate compounds.

Component a) and b) monomers may together constitute, for example, 5 to 100%, preferably 25 to 90% and more preferably 40 to 80% of the weight of the curable composition.

Component c) monomers may constitute up to 50% of the weight of the curable composition, provided that if the component c) monomer has a boiling temperature of less than 100° C., then it is present in an amount such that the curable composition contains no more than 2% by weight of organic compounds having a boiling temperature 100° C. A preferred amount, if any are present, is 0.01 to 25% by weight, or 0.01 to 10% if the component c) monomer boils below 100° C.

Free radical initiators, if present, may constitute up to 20% of the weight of the curable composition. A preferred amount is 1 to 10% by weight. A more preferred amount is 2-5% by weight. If the curable composition is to be plasma cured or radiation cured, it is possible to omit the free radical initiator.

The carrier or mixture of carriers, if present, may constitute, for example, 2 to 95%, preferably 10 to 75% by weight of the curable composition.

Finishing attribute chemicals, when present, may in the aggregate constitute from 0.01 to 70%, preferably 0.01 to 10% of the weight of the curable composition. Forensic markers may be even lower, in the 1-1000 ppm level.

Other materials may in the aggregate constitute 0.01 to 70%, preferably 0.01 to 50%, more preferably 0.01 to 25%, and still more preferably 0.01 to 10%, of the weight of the curable composition.

A preferred curable composition contains 4 to 85% of component a), 2 to 25% of component b), 10 to 70%, more preferably 15 to 50%, of one or more carriers, and 0 to 35%, preferably 1 to 25% of one or more functional attribute materials. Another preferred curable composition contains 16 to 70% of component a), 3 to 20% of component b), 25-50% of one or more carriers, and 0 to 35%, preferably 1 to 25% of one or more functional attribute materials. Such preferred curable compositions contain 1 to 10 weight percent of one or more free-radical initiators. In some embodiments of such preferred curable compositions, component a) includes one or more acrylate or methacrylate monomers; component b) includes one or more monomers having 2 to 6 acrylate or methacrylate groups, component c) if present, includes one or more fatty acid acrylate compounds, and component e) includes one or more of a wax and a silicone oil.

An especially preferred curable composition includes at least one solid (at 22° C.) component a) monomer and at least one liquid (at 22° C.) component a) monomer. Such a composition may contain 10 to 35% by weight of a solid component a) monomer and from 6-50%, especially 6-30%, of a liquid component a) monomer. In such a composition, the solid component a) monomer may include a fatty acid acrylate in which the fatty acid group contains 18 or more carbon atoms, and the liquid component a) monomer may be a fatty acid acrylate in which the fatty acid group contains up to 16 carbon atoms and/or a fatty acid methacrylate in which the fatty acid group contains up to 18 carbon atoms. Such an especially preferred curable composition may contain 3-20% of component b). The component b) material in such a composition may include one or more of an alkane diol diacrylate, a pentaerythritol or dipentaerythritol polyacrylate and a drying oil such as linseed, safflower or tung oil. This especially preferred curable composition may contain 20-50% of component e), where component e) preferably includes at least one of a fatty alcohol, a wax and a silicone oil. This especially preferred curable composition may optionally contain 1-25% of at least one finishing attribute chemical, and may contain up to 2% of a component c) monomer (if any at all).

The curable composition can be prepared by simple mixing of the ingredients. It is often advantageous to heat the ingredients as they are mixed, especially when low-melting materials (such as, for example, component c) and certain carriers which are solid at room temperature) are present. The order of addition is generally not important, except that if a free-radical initiator is included, it preferably is added at the end after the composition has cooled to close to room temperature. A preferred method of forming the composition is to combine them and heat the mixture to 60 to 100° C. with agitation, to allow the low-melting ingredients to melt and mix with the liquid ingredients. After the ingredients have mixed, the mixture then is preferably cooled with stirring.

As the mixture cools, certain of the low-melting ingredients may re-solidify. In such a case, it is preferred that those ingredients re-solidify in the form of discrete particles, rather than as a continuous or co-continuous phase which can cause the entire composition to become solid. Continued agitation during the cooling process and even for some time afterward has been found in some cases to prevent the composition from being entirely solidified due to the re-solidification of the low melting ingredients.

The physical form of the product is, therefore, a liquid at 22° C. or a suspension of solid particles in a continuous phase that is liquid at 22° C. The liquid may be a single-phase liquid, or may consist of two or more discrete or co-continuous phases. The liquid preferably is only slightly viscous, having, for example, a viscosity of at least 25 cps, preferably at least 50 cps at 22° C. The viscosity of the liquid phase preferably is not greater than 50,000 cps, more preferably not greater than 5,000 and still more preferably not more than 1,000 cps at 22° C.

The solid phase, if any, will include high-melting ingredients, which do not melt during the mixing step, as well as any low-melting ingredients which re-solidify as discussed before.

Because the curable composition is a liquid or suspension, it can be applied to a fibrous substrate by any many convenient methods, such as by rolling, brushing, spraying, immersing the textile into the composition, applying a puddle and scraping the composition into the textile using, for example, and air knife or doctor blade, and the like. A particularly useful way of applying it, especially in a continuous industrial process, is to roll it onto the substrate using a roller. The curing composition in such cases is applied to the roller in any convenient manner and transferred to the substrate by contacting the substrate with the roller. It is preferable that the application method be capable of uniform application across the width of the substrate and also be capable of repeatedly applying a desired chemical coating weight in units of several grams per square meter, as defined below.

A preferred coating weight applied to the substrate by each chemical transfer apparatus is 1 to 70 g/m$^2$, especially 2 to 50 g/m$^2$ or 3 to 15 g/m$^2$. Coating weights can be applied using two or more chemical transfer apparatuses in series or by passing the substrate through a chemical transfer apparatus multiple times. A significant advantage of this invention is that very low coating weights, of the order of 1 to 10 or even 1 to 5 g/m$^2$, are easily applied. It has been surprisingly found that very effective hydrophobic and or oleophobic coatings can be formed onto a variety of substrates using these very low coating weights.

Conditions during the step of applying the curable composition to the substrate are selected such that no significant curing of the monomer(s) occurs until the composition has been applied onto the substrate. As used herein, "curing" and "polymerization" are used interchangeably. If the chemical treatment mixture contains a free radical initiator, temperature conditions during the chemical application step are generally maintained below the decomposition temperature of the free radical initiator until the composition has been applied onto the substrate. In addition, it is preferred that no other source of free radicals (such as those described below) is present during the application step.

In general, the polymerization step is performed by subjecting to the treated substrate to a source of free radicals. Free radicals can be provided in several ways. If the chemical treatment mixture contains a heat-activated free-radical initiator, free radicals can be provided by heating the treated substrate to a temperature at which the free radical initiator generates free radicals. Heating of the substrate may be done in an oven, during the chemical application step, or by alternative means, such as exposure to microwave energy, or by any combination thereof.

Alternatively, the treated substrate may be contacted with a source of free radicals, such as an atmospheric pressure plasma or a vacuum-based plasma. The treated substrate may be exposed to ultraviolet radiation, e-beam radiation or ionizing radiation source to produce free radicals. The treated substrate can be contacted with an additional component, not present in the curing composition, such as a spray of hydrogen peroxide, to generate free radicals for the curing reaction. Such a spray may contain one or more promoters or activators, or may be in combination with component g) as described above.

The preferred way of providing free radicals is to include a heat-activated free radical initiator within the curable composition, and then apply heat to the treated substrate to at least partially effect the cure. Heat can be applied to the treated substrate in any convenient way, including by a heater and blower apparatus which blows a hot gas onto the coated substrate, by passing the treated substrate through an oven or tenter frame, by pulling the treated substrate over a series of heated rolls, by providing a microwave generator and exposing the treated substrate to the generated microwaves, and the like.

Preferred curing temperatures are from 110 to 210° C., preferably 125 to 160° C. and more preferably 130 to 150° C.

It has been found that particularly good results can be obtained if the curable composition is caused to penetrate into or between the fibers of the fibrous substrate before and/or during curing. There are several convenient ways of doing this. One way is simple mechanical compression, as may be applied, for example, using one or more sets of nip rollers, a press or other mechanical apparatus.

In one aspect of the invention, a small amount of liquid water is applied to at least one surface of the substrate. This can be done before, at the same time as, or after the curable composition is applied. The amount of applied water preferably is small, such as up to 75%, more preferably up to 55%, of the weight of the fibrous substrate. The moistened and coated fibrous substrate is then heated to volatilize the water, briefly producing steam at superatmospheric pressure. Although the invention is not limited to any theory, this is believed to assist the curable composition to penetrate into and/or between the fibers of the fibrous substrate, which in turn promotes better adhesion and/or better performance, especially at very low coating rates. The curable coating composition is cured, simultaneously or afterward, as before.

As an alternate embodiment of the invention, the liquid water used to generate steam at superatmospheric pressure, may contain a free-radical initiator and/or an activator or promoter, to promote polymerization.

In a third aspect of the invention, the coated fibrous substrate is heated in the presence of a gas of a blowing agent to produce a superatmospheric pressure. The blowing agent is as described before, and preferably forms a gas at a temperature of at least 100° C. The blowing agent may be incorporated into the curable coating composition. If a gas is used, it is preferably non-organic. Carbon dioxide, nitrogen, argon, helium, air and the like are all useful. Curing is done simultaneously and/or after the superatmospheric pressure gas is produced.

The step of producing a superatmospheric pressure can be done in some embodiments by passing the substrate through one or more pairs of heated rollers, by heating the substrate in a press, by contacting the coated substrate with another heated surface or with a hot gas, and the like. In especially preferred embodiments, at least partial curing is performed at the same time the superatmospheric pressure gas is formed.

In the second and third embodiment of the invention, additional curing if necessary can be performed after the gas has evolved.

The substrate can be any fibrous material that is capable of being carried through the coating process and the polymerization process. By "fibrous", it is meant that a surface of the substrate to which the chemical treatment mixture is applied is made up of or includes fibers of at least one type, and that the substrate includes spaces between the fibers into which the applied chemical treatment mixture can penetrate. The fibers may be, for example, woven, knitted, entangled, knotted, felted, glued or otherwise formed into a fabric, non-woven or textile having sufficient mechanical integrity to be carried through the process of the invention.

Flexible materials are preferred substrates, although 3-dimensional substrates, such as shoes can also be treated in this manner. When the substrate is in the form of a sheet, it should have a thickness of no greater than about 12 mm, and preferably has a thickness of no greater than 8 mm. The substrate can have any smaller thickness provided it has enough mechanical integrity to be conducted through the process. The curable composition in some embodiments is applied onto textile roll goods that may have widths of 100 mm or more, such as 300 mm up to 7 meters or more.

The substrate is in some embodiments a woven, knitted or non-woven fabric. Such a fabric includes fibers that may be, for example, a natural fiber such as cotton, hemp, wool, linen, silk, tencel, rayon, bamboo, cellulose and the like, or a synthetic fiber such as nylon, aramid, polypropylene, polyester, polyacetate, polylactic acid, cellulose ester or other fiber and blends of any two or more of the above. It may a smooth or fleeced fabric and it may contain a stretchable fiber, such as Elastane, Lycra, or Spandex.

In other embodiments, including, but not limited to shoes, the substrate may be coated on one side as is the case, for example, with leather, or synthetic leather products, such as vinyl, or for athletic shoes, polyester, polypropylene or nylon, including mixtures of synthetic and natural fibers, which have an exposed fibrous surface on the side that is coated. The substrate may be a nonwoven, or a cellulosic material such as paper or cardboard and the like.

The polymer formed by polymerizing the monomer(s) may fully or partially encapsulate the yarn or fibers that make up the substrate. The polymer may penetrate the yarn and form a chemical bond to the yarn or fibers in some embodiments. In embodiments in which the curable coating composition contains a finishing attribute chemical, this polymer often serves as a binder which affixes the finishing attribute chemical to the substrate. Thus, the finishing attribute chemical in some embodiments becomes dissolved or anchored using the polymer formed by curing the monomer(s).

Coated fibrous substrates made in accordance with this invention are useful in applications in which water and/or oil repellency are desired, such as water or stain-repellent treatments, moisture barriers, battery and fuel cell separators, bandages, antimicrobial fabrics, carpet stain and fade protection, wall and window furnishings, body armor and other para-aramids for ballistic or fire protection, rain gear and outdoor furniture coverings and upholstery, leather or canvas shoe and boot treatments, athletic shoes, headwear, capes, uniforms and other apparel, leather upholstery and apparel and other automotive and furniture upholstery, tents, awnings and tarpaulins, umbrellas, hospital scrubs and gowns, medical covers, blankets and bedding, mattress ticking, automotive nonwovens, outdoor performance and sports apparel, including but not limited to outerwear and sweatshirts.

The following examples are intended to illustrate the invention but not to limit the scope thereof. All parts and percentages are by weight unless otherwise indicated.

Example 1

A non-fluorocarbon, laundry-durable, water-repellent treatment is made for application on 100% polyester fleece by mixing the following ingredients:

Component a): 4.1 g stearyl methacrylate (liquid), 4.1 g lauryl acrylate (liquid), 15 g octadecyl acrylate (solid)

Component b): 4.7 g 1,6-hexanediol diacrylate, 1.4 g dipentaerythrital penta-/hexa acrylate, 4.3 g linseed oil Component e): 9.1 g paraffin wax, 10.8 g decamethylcyclopentasiloxane.

These ingredients are heated to 83° C. and form clear, yellow solution. The solution is allowed to cool to room temperature, and 2.5 g lauroyl peroxide (component d)) is added with further mixing.

If this material is then left to sit at room temperature, it solidifies, possibly due to the solid materials (such as octadecyl acrylate) forming a continuous or co-continuous phase. However, by stirring the material for several hours, a suspension of solid particles within a liquid phase instead forms. The solid phase of the suspension may contain particles of the paraffin wax and/or the octadecyl acrylate.

0.8 to 1.6 mL of this suspension is applied to the face side of an 8"×8" swatch of 100% polyester fabric using a paint roller. The mixture is cured by heat-pressing the coated fabric for 60 seconds on a heat plate operated between 120 to 205° C. A light water spray is applied to the surface of the fabric before curing it to generate steam as it is heated. The treatment provides durable water-repellent treatment without the use of fluorocarbons and also had a nice "hand". No significant color change to the fabric is observed. Additional oven-curing is not necessary, but doing so increases durability during multiple laundry cycles. These samples withstand more than 65 sequential wash/dry cycles without any observable water repellency degradation. By contrast, a commercial, fluorocarbon-based "wet" treatment applied to the same fabric and subjected to the same laundry testing is fully removed by laundry exposure after only 30 wash/dry cycles.

Example 2

A non-fluorocarbon, impermeable water-repellent treatment is made for application on 100% acrylic outdoor furniture fabric by mixing the following ingredients:
Component a): 2.2 g stearyl methacrylate (liquid), 2.3 g of lauryl acrylate, (liquid) 10.1 g octadecyl acrylate (solid)
Component b): 2.8 g of 1,6 hexanediol diacrylate, 0.8 g of dipentaerythritol penta-/hexa acrylate
Component e:) 6.3 g paraffin wax, 7.3 g decamethylcyclopentasiloxane These ingredients are heated to 83° C. and form clear solution. The solution is allowed to cool to room temperature, and 1.5 g lauroyl peroxide (component d)) is added with further mixing. This mixture is left stirring overnight on a cold stirring hotplate, resulting in a thick suspension, similar in consistency to the mixture of Example 1.

The face side of various 8"×8" swatches of 100% acrylic awning or outdoor furniture upholstery fabric each are coated with 2-3 mL of this suspension using a paint roller. A light water aerosol spray is applied to the surface of the coated swatches. The water is volatilized and the coating composition is cured by heat-pressing the moistened and coated swatches for 80 seconds on a heat press operated at 205° C. The cured swatches were impermeable to penetration when sprayed with water continuously for 15 minutes.

One of the thus-treated samples is then coated on each side with a hot (65° C.) fluorocarbon liquid mixture that contained 0.7 g azobisisobutyronitrile and 9.2 g of 2-(perfluorohexyl) ethyl acrylate. The coated sample is then pressure heat pressed at 160° C. for 80 seconds without the prior addition of water spray to cure the polymer. The sample is then oven cured for 10 minutes at 125° C. to complete the curing. At the completion of the curing process, the coated aramid sample is resistant to dodecane penetration as well as water penetration, indicating both hydrophobicity and oleophobicity treatment.

Example 3

Another curing composition was made in the same general manner described in Examples 1 and 2, using these ingredients:
Component a): 6.7 g of lauryl acrylate (liquid), 20.2 g octadecyl acrylate (solid)
Component b): 6 g of 1,6 hexanediol diacrylate, 2 g dipentaerythritol penta-/hexa acrylate, 5.3 g linseed oil
Component d): 3.4 g lauroyl peroxide
Component e): 14 g paraffin wax, 18.4 g decamethylcyclopentasiloxane All ingredients except the lauryl peroxide are heated on a hot plate until a solution forms, then are allowed to cool while being constantly stirred. When the temperature reaches to 40° C., the lauroyl peroxide is added and the mixture is continuously stirred for another 24 hours to, forming a suspension similar to those described in Examples 1 and 2.

Using a roller, 1 mL of the resulting suspension is coated onto both sides of several 8"×8" swatches of aramid fabric. The coated swatches are then sprayed with an aerosol spray of water and pressure-heated for 80 seconds at about 140° C. to volatilize the water and partially cure the composition. The samples are then oven-cured for 15 minutes at 123 C. The samples were able to withstand a pressurized spray of 10 L/min of water for 10 minutes with only 7.5% water absorption by weight.

Example 4

A suspension is formed in the same general manner described in Examples 1-3 from the following ingredients:
Component a): 0.81 g stearyl methacrylate (liquid), 1.1 g lauryl acrylate (liquid), 4.8 g of 2-(perfluorohexyl) ethyl acrylate (liquid), 4.0 g octadecyl acrylate (solid)
Component b): 1.4 g 1,6 hexanediol diacrylate
Component d): 1.3 g azobisisobutyronitrile
Component e): 6.7 g paraffin wax, 3.6 g of decamethylcyclopentasiloxane
Component f): 4.2 g of PTFE "Teflon" micropowder (10-50 μm particle size).

After stirring overnight at room temperature, a thick white suspension forms. The PTFE micropowder does not dissolve. The slurry is applied to both sides of an aramid test sample using a roller. The coated sample is heat pressed at 160° C. for 80 seconds without the prior addition of water spray. The curing is completed by placing the sample in an oven for 10 minutes at 120° C. When fully cured, the polymerized coating resists dodecane penetration and water penetration.

What is claimed is:
1. A curable coating composition comprising:
   a-1) at least one monomer having exactly one free-radical polymerizable group per molecule and being a liquid at 22° C., the at least one monomer having at least one hydrocarbyl group that has at least eight carbon atoms bonded directly or indirectly to the polymerizable group, wherein the hydrocarbyl group may be nonfluorinated, partially fluorinated or perfluorinated, the at least one monomer having a boiling temperature equal to or greater than 100° C.,
   a-2) at least one monomer having exactly one free-radical polymerizable group per molecule and being a solid at 22° C., the at least one monomer having at least one hydrocarbyl group that has at least eight carbon atoms bonded directly or indirectly to the polymerizable group, wherein the hydrocarbyl group may be nonfluorinated, partially fluorinated or perfluorinated, the at least one monomer having a boiling temperature equal to or greater than 100° C.,
   b) at least one monomer having at least two free-radical polymerizable groups and a boiling temperature equal to or greater than 100° C.; and
   2 to 98 weight percent, based on the weight of the curable coating composition, of at least one linear, branched or cyclic polysiloxane;
   wherein the coating composition is a liquid at 22° C. or a suspension of one or more solids in a liquid phase at 22° C.

2. The coating composition of claim 1 which contains no more than 10% by weight of organic compounds that have boiling temperatures below 100° C. and no more than 5% by weight water, based on the entire weight of the coating composition.

3. The coating composition of claim 2 wherein components a-1) and a-2) have a solubility in water of no greater than 1 part by weight per 100 parts by weight of water at 30° C., and water is soluble in each of components a-1.) and a-2) to the extent of no greater than 1 part by weight per 100 parts by weight of components a-1) and a-2) at 30° C.

4. The coating composition of claim 3, wherein the polymerizable group of components a-1) and a-2) is an acrylate or methacrylate group.

5. A curable coating composition comprising
   a) a mixture of at least one monomer having exactly one free-radical polymerizable acrylate or methacrylate group per molecule and which is a liquid at 22° C. and at least one monomer having exactly one free-radical polymerizable acrylate or methacrylate group per molecule and which is a solid at 22° C., wherein component a) has a solubility in water of no greater than 1 part by weight per 100 parts by weight of water at 30° C., and water is soluble in component a) to the extent of no greater than 1 part by weight per 100 parts by weight of component a) at 30° C., and
   b) at least one monomer having at least two free-radical polymerizable groups and a boiling temperature equal to or greater than 100° C.;
   wherein the coating composition is a liquid at 22° C. or a suspension of one or more solids in a liquid phase at 22° C., the coating composition contains no more than 10% by weight of organic compounds that have boiling temperatures below 100° C. and no more than 5% by weight water, based on the entire weight of the coating composition.

6. The coating composition of claim 1 wherein component b) includes at least one polyacrylate compound having 2 to 8 acrylate and/or methacrylate groups per molecule, at least one drying oil, or a mixture of thereof.

7. The coating composition of claim 1 wherein component b) includes one or more of 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, dipentaerythritol hexacrylate, 1,4-butanediol dimethacrylate, 1,6-hexanediol dimethacrylate, 1,8-octanediol dimethacrylate, cyclohexane dimethanol dimethacrylate, trimethylolpropane trimethacrylate, glycerin trimethacrylate, pentaerythritol tetramethacrylate, dipentaerythritol tetramethacrylate, dipentaerythritol hexamethacrylate, linseed oil, safflower oil and tung oil.

8. The coating composition of claim 1, further comprising a heat-activatable free radical initiator.

9. The coating composition of claim 1 which contains no more than 1% by weight of organic compounds that have boiling temperatures below 100° C. and no more than 1% by weight water, based on the entire weight of the coating composition.

10. The coating composition of claim 1, further comprising a wax.

11. The coating composition of claim 4, further comprising a wax.

12. The coating composition of claim 5, further comprising a wax.

* * * * *